United States Patent
Karim et al.

(10) Patent No.: US 9,827,555 B2
(45) Date of Patent: *Nov. 28, 2017

(54) CATALYST FOR CONVERSION OF SYNTHESIS GAS

(71) Applicant: SAUDI BASIC INDUSTRIES CORPORATION, Riyadh (SA)

(72) Inventors: Khalid Karim, Riyadh (SA); Mohammad Abdur Rakib, Riyadh (SA); Asad Ahmad Khan, Riyadh (SA); Mohammed Al-Semahi, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/907,856

(22) PCT Filed: Jul. 28, 2014

(86) PCT No.: PCT/IB2014/002468
§ 371 (c)(1),
(2) Date: Jan. 27, 2016

(87) PCT Pub. No.: WO2015/015316
PCT Pub. Date: Feb. 5, 2015

(65) Prior Publication Data
US 2016/0167025 A1    Jun. 16, 2016

Related U.S. Application Data

(60) Provisional application No. 61/860,464, filed on Jul. 31, 2013.

(51) Int. Cl.
| | | |
|---|---|---|
| *B01J 23/889* | (2006.01) | |
| *C10G 2/00* | (2006.01) | |
| *B01J 37/03* | (2006.01) | |
| *B01J 37/04* | (2006.01) | |
| *B01J 37/10* | (2006.01) | |
| *B01J 35/10* | (2006.01) | |

(52) U.S. Cl.
CPC ....... *B01J 23/8892* (2013.01); *B01J 35/1019* (2013.01); *B01J 35/1023* (2013.01); *B01J 37/031* (2013.01); *B01J 37/04* (2013.01); *B01J 37/10* (2013.01); *C10G 2/332* (2013.01); *B01J 2523/00* (2013.01); *C10G 2400/20* (2013.01); *C10G 2400/22* (2013.01)

(58) Field of Classification Search
None
See application file for complete search history.

(56) References Cited

U.S. PATENT DOCUMENTS

| | | |
|---|---|---|
| 3,907,716 A | 9/1975 | Haacke |
| 4,057,513 A | 11/1977 | Biedermann et al. |
| 4,122,110 A | 10/1978 | Sugier et al. |
| 4,177,203 A | 12/1979 | Kolbel et al. |
| 4,451,579 A | 5/1984 | Lemanski et al. |
| 4,562,174 A | 12/1985 | Stiles |
| 4,874,732 A | 10/1989 | Miller et al. |
| 5,162,284 A | 11/1992 | Soled et al. |
| 5,248,701 A | 9/1993 | Soled et al. |
| 5,502,019 A | 3/1996 | Augustine et al. |
| 5,958,985 A | 9/1999 | Geerlings et al. |
| 5,981,608 A | 11/1999 | Geerlings et al. |
| 5,990,369 A | 11/1999 | Barger et al. |
| 6,362,239 B1 | 3/2002 | Buess et al. |
| 6,455,595 B1 | 9/2002 | O'Rear et al. |
| 6,680,272 B2 | 1/2004 | Buess et al. |
| 6,759,440 B2 | 7/2004 | Geerlings et al. |
| 7,253,136 B2 | 8/2007 | Mauldin et al. |
| 7,365,040 B2 | 4/2008 | Van Berge et al. |
| 7,375,055 B2 | 5/2008 | Van Berge et al. |
| 7,807,602 B2 | 10/2010 | Reynhout |
| 8,062,620 B2 | 11/2011 | Dogterom et al. |
| 8,153,851 B2 | 4/2012 | Gartside et al. |
| 9,545,620 B2 | 1/2017 | Karim et al. |
| 2008/0033218 A1 | 2/2008 | Lattner et al. |

(Continued)

FOREIGN PATENT DOCUMENTS

| | | |
|---|---|---|
| CN | 1016791 B | 5/1992 |
| CN | 1029089 C | 6/1995 |

(Continued)

OTHER PUBLICATIONS

Das D, et al. Synthesis of light alkenes from syngas on silicalite-1 supported cobalt and cobalt-manganese catalysts. Applied Catalysis, A: General, 131(2): 335-345.

Mirzaei AA, et al. (2006) Effect of preparation conditions on the catalytic performance of cobalt manganese oxide catalysts for conversion of synthesis gas to light olefins. Applied Catalysis, A: General, 306: 98-107.

Zhao JJ, et al. (2010) The Effect of Co Loading on the Performance of CoxMn0.06/SiO2 Catalysts for the Synthesis of Light Hydrocarbons from Co Hydrogenation. Energy Sources, Part A: Recovery, Utilization, and Environmental Effects, 32(15): 1408-1415.

Martinez, et al., "Fischer-Tropsch synthesis of hydrocarbons over mesoporous Co/SBA-15 catalysts: the influence of metal loading, cobalt precursor, and promoters", Journal of Catalysis 220 (2003) pp. 486-499.

(Continued)

*Primary Examiner* — Colin W Slifka
(74) *Attorney, Agent, or Firm* — Ballard Spahr LLP

(57) ABSTRACT

The disclosed subject matter presents a catalyst or catalyst composition as well as the methods of making and using the catalyst or catalyst composition. In one aspect, the disclosed subject matter relates to a catalyst comprising $CoMn_aSi_bX_cY_dO_x$ wherein in X comprises an element from Group 11; Y comprises an element from Group 12; a ranges from 0.8 to 1.2; b ranges from 0.1 to 1; c ranges from 0.01 to 0.05; d ranges from 0.01 to 0.05; x is a number determined by the valency requirements of the other elements present; and wherein the catalyst converts synthesis gas to at least one olefin.

18 Claims, No Drawings

(56) References Cited

U.S. PATENT DOCUMENTS

| | | | |
|---|---|---|---|
| 2008/0214863 A1* | 9/2008 | Cremer | B01J 23/002 562/535 |
| 2012/0115967 A1 | 5/2012 | Bezemer et al. | |
| 2012/0208905 A1 | 8/2012 | Sato et al. | |
| 2012/0245236 A1 | 9/2012 | Suib et al. | |
| 2015/0321972 A1* | 11/2015 | Karim | B01J 37/031 518/721 |

FOREIGN PATENT DOCUMENTS

| | | |
|---|---|---|
| CN | 1029116 C | 6/1995 |
| CN | 1029525 C | 8/1995 |
| CN | 1187180 A | 7/1998 |
| CN | 102500425 A | 6/2012 |
| EA | 024093 B1 | 8/2016 |
| EP | 1452231 A1 | 9/2004 |
| EP | 2422876 A1 | 2/2012 |
| GB | 833976 A | 5/1960 |
| WO | WO-03/041860 A2 | 5/2003 |
| WO | WO-03/076074 A1 | 9/2003 |
| WO | WO-9700231 A1 | 1/2007 |
| WO | WO-2008147836 A1 | 12/2008 |
| WO | WO-2010/049715 A1 | 5/2010 |
| WO | WO-2012/084160 A1 | 6/2012 |
| WO | WO-2014/001354 A1 | 1/2014 |

OTHER PUBLICATIONS

Dinse, et al., "Effects of Mn promotion on the activity and selectivity of Co/SiO2 for Fischer-Tropsch Synthesis", Journal of Catalysis, 288 (2012) pp. 104-114.

International Search Report and Written Opinion dated Jun. 8, 2015 for international application PCT/IB2014/002468, filed on Jul. 28, 2014 and published as WO 2015/015316 dated Feb. 5, 2015 (Applicant—Saudi Basic Industries Corporation // Inventor—Karim, et al.) (14 pages).

Colley, S., et al., Carbon Monoxide Hydrogenation Using Cobalt Manganese Oxide Catalysts: Initial Catalyst Optimization Studies (1988) Ind. Eng. Chem. Res. 27:1339-1344.

Commereuc, D., et al., "Catalytic synthesis of low molecular weight olefins from Co and H2 with Fe(Co)5, Fe3(Co)12, and [HFe3(Co)11]—supported on inorganic oxides" (1980) J. Chem. Soc., Chem. Commun. 154-155.

Dry (2004) Stud. Surf. Sci. Catal 152:197-230 in "Fischer-Tropsch technology" eds. Steynberg and Dry.

Keyser, M., et al., Fischer-Tropsch studies with cobalt-manganese oxide catalysts: Synthesis performance in a fixed bed reactor Applied Catalysis A: General (1998)171(1): 99-107.

Okuhara, T., et al., "Synthesis of light olefins from Co and H2 over highly dispersed Ru/K—Al2O3 derived from Ru3(Co)12" (1981) J. Chem. Soc., Chem. Commun. 1114-1115.

Van Der Riet, M., et al., "Selective formation of C3 hydrocarbons from co+H2 using cobalt-manganese oxide catalysts" (1986) J. Chem. Soc. Chem. Commun 798-799.

International Search Report and Written Opinion dated Oct. 10, 2013 by the International Searching Authority for International Application No. PCT/EP2013/063311, which was filed on Jun. 25, 2013 and published as WO/2014/001354 dated Jan. 3, 2014 (Applicant—Saudi Basic Industries Corporation) (8 pages).

International Preliminary Report on Patentability dated Dec. 31, 2014 by the International Searching Authority for International Application No. PCT/EP2013/063311, which was filed on Jun. 25, 2013 and published as WO/2014/001354 dated Jan. 3, 2014 (Applicant—Saudi Basic Industries Corporation) (6 pages).

* cited by examiner

CATALYST FOR CONVERSION OF SYNTHESIS GAS

CROSS-REFERENCE TO RELATED APPLICATION

This is a U.S. National Phase Application of International Application No. PCT/IB2014/002468, filed Jul. 28, 2014, which claims the benefit of U.S. Provisional Application No. 61/860,464, filed on Jul. 31, 2013, which are both incorporated herein by reference in their entirety.

BACKGROUND

Syngas comprises hydrogen ($H_2$) and carbon monoxide (CO) and can be readily produced from either coal or methane (natural gas) by methods well known in the art and widely commercially practiced around the world. Syngas can also be produced from biomass, via a number of well-known processes.

The Fischer-Tropsch process for the catalytic production of hydrocarbons from syngas originated in the 1920s. It was used in South Africa for years to provide gasoline range hydrocarbons for use as fuel in automobiles. Often, the catalysts employed were comprised of iron or cobalt supported on alumina or titania as well as promoters such as rhenium, zirconium, or manganese that would improve catalytic performance. The reaction conditions typically yielded gasoline range hydrocarbons and heavier weight hydrocarbon products. More modern applications of the Fischer-Tropsch reaction have been focused on the production of heavier hydrocarbons suitable for use as diesel fuels, and or waxy hydrocarbon molecules suitable for conversion to clean, efficient lubricants.

There remains a need for a catalyst and accompanying promoter and support that demonstrates a high olefin hydrocarbon selectivity while having low carbon dioxide promotion.

SUMMARY

In accordance with the purpose(s) of the invention, as embodied and broadly described herein, the invention, in one aspect, relates to a catalyst comprising $CoMn_aSi_bX_cY_dO_x$; wherein X comprises an element from Group 11; Y comprises an element from Group 12; a ranges from 0.8 to 1.2; b ranges from 0.1 to 1; c ranges from 0 to 0.05; d ranges from 0 to 0.05; x is a number determined by the valency requirements of the other elements present; and wherein the catalyst converts synthesis gas to at least one olefin. Disclosed are methods of making and using the catalyst or the catalyst composition.

In a further aspect, the invention relates to a catalyst comprising $CoMn_aSi_bCu_cZn_dO_x$; wherein; a ranges from 0.8 to 1.2, b ranges from 0.1 to 1; c ranges from 0.001 to 0.05; d ranges from 0.001 to 0.05; x is a number determined by the valency requirements of the other elements present; and wherein the catalyst converts synthesis gas to at least one olefin.

Also disclosed are methods for using a catalyst or catalyst composition comprising: a) contacting the catalyst or the catalyst composition with a synthesis gas; and b) forming a product mixture comprising an olefin.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. DEFINITIONS

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. CATALYST AND CATALYST COMPOSITION

1. Catalyst

In one aspect, the present disclosure relates to a catalyst comprising $CoMn_aSi_bX_cY_dO_x$;

wherein X comprises an element from Group 11; Y comprises an element from Group 12;

a ranges from 0.8 to 1.2;

b ranges from 0.1 to 1;

c ranges from 0 to 0.05;
d ranges from 0 to 0.05;
x is a number determined by the valency requirements of the other elements present;
and wherein the catalyst converts synthesis gas to at least one olefin.

In another aspect, the present disclosure relates to a catalyst for converting synthesis gas to an olefin, wherein the catalyst comprises $CoMn_aSi_bCu_cZn_dO_x$; wherein:
a ranges from 0.8 to 1.2;
b ranges from 0.1 to 1;
c ranges from 0 to 0.05;
d ranges from 0 to 0.05;
x is a number determined by the valency requirements of the other elements present; and
wherein the catalyst converts synthesis gas to at least one olefin.

In one aspect, X comprises a Group 11 element. In a further aspect, X comprises Cu, Ag, or Au, or a combination thereof. In an even further aspect, X consists of Cu, Ag, or Au, or a combination thereof. In one aspect, X is copper.

In one aspect, Y comprises a Group 12 element. In a further aspect, Y comprises Zn, Cd, or Hg, or a combination thereof. In an even further aspect, Y consists of Zn, Cd, or Hg, or a combination thereof. In one aspect, Y is zinc.

In one aspect, a ranges from 0.8 to 1.2, including representative values of 0.85, 0.9, and 1.1. In a further aspect, the range can be derived from any two representative values. For example, a can range from 0.85 to 1.1.

In one aspect, b ranges from 0.1 to 1, including representative values of 0.2, 0.3, 0.4, 0.5, 0.6, 0.7, 0.8 and 0.9. In a further aspect the range can be derived from any two representative values. For example, b can range from 0.2 to 1.

In one aspect, the individual c ranges for each X ranges from 0 to 0.05, including representative values of 0.01, 0.02, 0.03, 0.04, and 0.05. In a further aspect, the range can be derived from any two representative values. For example, c can range from 0.02 to 0.04.

In one aspect, the total c ranges from 0 to 0.05, including representative values of 0.01, 0.02, 0.03, 0.04, and 0.05. In a further aspect, the range can be derived from any two representative values. For example, the total c can range from 0.02 to 0.04.

In one aspect, the individual d ranges for each Y ranges from 0 to 0.05, including representative values of 0.01, 0.02, 0.03, 0.04, and 0.05. In a further aspect, the range can be derived from any two representative values. For example, d can range from 0.01 to 0.05.

In one aspect, total d ranges from 0 to 0.05, including representative values of 0.01, 0.02, 0.03, 0.04, and 0.05. In a further aspect, the range can be derived from any two representative values. For example, total d can range from 0.01 to 0.05.

In one aspect, the catalyst does not comprise a carbonate group. The carbonate group can also include an ester or a carboxylic acid. In another aspect, the catalyst does not comprise a group comprising a carbon chain.

In one aspect, Si is an amorphous silica form.

In one aspect, Si is an amorphous silica form at pH 3 to 5 including representative values 3.2, 3.6, 3.8, 4.0, 4.2, 4.4, 4.6, 4.8, and 5.0. In a further aspect, the range can be derived from any two representative values. For example, the pH of the amorphous silica can range from 3.2 to 4.8.

In a further aspect, the specific surface area of the silica ranges from 100 $m^2/g$ to 800 $m^2/g$ including the representative values 100 $m^2/g$, 130 $m^2/g$, 160 $m^2/g$, 170 $m^2/g$, 180 $m^2/g$, 190 $m^2/g$, 200 $m^2/g$, 210 $m^2/g$, 220 $m^2/g$, 230 $m^2/g$, 240 $m^2/g$, 250 $m^2/g$, 260 $m^2/g$, 270 $m^2/g$, 280 $m^2/g$, 290 $m^2/g$, 300 $m^2/g$, 400 $m^2/g$, 500 $m^2/g$, 600 $m^2/g$, 700 $m^2/g$, or 800 $m^2/g$. The range can be derived from any two representative values. For example, the specific surface area of the silica can range from 200 $m^2/g$ to 500 $m^2/g$.

In one aspect, the catalyst can have any suitable structure.

The catalysts disclosed herein can include the catalyst compositions disclosed herein and be prepared or used by the methods disclosed herein.

2. Catalyst Composition

In one aspect the catalyst comprises a catalyst support.

In another aspect, the catalyst support comprises magnesia, alumina, silica, zirconia, titania, carbon or zeolite, or a combination thereof.

In one aspect, the method of making the catalyst composition comprises adding magnesia in any suitable form. In another aspect, magnesia can be added using a magnesia compound comprising chloride, bromide, iodide, fluoride, nitrate, sulphate, perchlorate, acetate, acetyl acetonate, phosphate, carbonate, or the like, or the combination thereof. In still a further aspect, the magnesia can be in the form of magnesium silicon dioxide.

In another aspect, the method of making the catalyst composition comprises adding alumina in any suitable form. In another aspect, alumina can be added using an alumina compound comprising chloride, bromide, iodide, fluoride, nitrate, sulphate, perchlorate, acetate, acetyl acetonate, phosphate, carbonate, or the like, or the combination thereof. In still a further aspect, the alumina can be added in the form of alumina silicon oxide.

In one aspect, the method of making the catalyst composition comprises adding silica in any suitable form. In still a further aspect, the silica can be added in the form of silicon dioxide.

In one aspect, the method of making the catalyst composition comprises adding zirconia in any suitable form. In another aspect, zirconia can be added using a zirconia compound comprising oxide, chloride, bromide, iodide, fluoride, nitrate, sulfate, perchlorate, acetate, acetyl acetonate, phosphate, or carbonate, or the like, or the combination thereof. In a further aspect, the zirconia can be in form of zirconium oxide.

In one aspect, the method of making the catalyst composition comprises adding titania in any suitable form. In another aspect, titania can be added using a titania compound comprising oxide, chloride, bromide, iodide, fluoride, nitrate, sulfate, perchlorate, acetate, acetyl acetonate, phosphate, or carbonate, or the like, or the combination thereof. In a further aspect, the titania can be in the form of titanium oxide.

In one aspect, the carbon of the catalyst support can be activated carbon or nonactivated carbon, or a combination thereof. In yet another aspect, the catalyst support can comprise any suitable form of carbon.

In one aspect, the catalyst support is zeolite. In a further aspect, the zeolite of the catalyst support is an aluminosilicate. In another aspect, the zeolite can be analcime, natrolite, stilbite, or philipsite. In another aspect, zeolite can be added using a zeolite compound comprising aluminium or silicate. In a further aspect, the zeolite support is in the form of an aluminium silicate zeolite (ZSM).

In another aspect, the catalyst composition is in the form of a fluidizable particle, a shaped pellet, a sphere, or a shaped extrudate. In another aspect, the catalyst composition or catalyst support can be in any suitable form.

In one aspect, the catalyst composition or the catalyst support can be in fluidized or shaped form. In another aspect, the catalyst composition or catalyst support can be in any suitable form.

In one aspect, the catalyst composition comprises a single support. In another aspect, the catalyst composition comprises more than one support.

In addition to the foregoing components, the disclosed catalyst compositions can optionally comprise a balance amount of one or more additive materials ordinarily incorporated into catalyst compositions of this type, with the proviso that the additives are selected so as to not significantly adversely affect the desired properties of the catalyst composition. Combinations of additives can be used. Such additives can be mixed at a suitable time during the mixing of the components for forming the composition. Representative and non-limiting examples of additive materials that can be present in the disclosed catalyst compositions include an antioxidant, a stabilizer (including for example a thermal stabilizer, a hydrolytic stabilizer, or a light stabilizer), UV absorbing additive, plasticizer, lubricant, mold release agent, acid scavenger, antistatic agent, or colorant (e.g., pigment and/or dye), or any combination thereof.

In one aspect, the acid scavenger comprises phosphorous acid, phosphoric acid, mono zinc phosphate, mono sodium phosphate, or sodium acid pyrophosphate or a combination thereof.

Suitable antioxidant additives include, for example, organic phosphites such as tris(nonyl phenyl)phosphite, tris (2,4-di-t-butylphenyl)phosphite, bis(2,4-di-t-butylphenyl) pentaerythritol diphosphite, distearyl pentaerythritol diphosphite or the like, or the combination thereof; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants.

In one aspect, the antioxidant is present in an amount from about 0.1 wt. % to about 1 wt. %, based on the total weight of the catalyst composition. In another aspect, the antioxidant is present in an amount from about 0.1 wt. % to about 0.9 wt. %, based on the total weight of the catalyst composition. In still another aspect, the antioxidant is present in an amount from about 0.1 wt. % to about 0.7 wt. %, based on the total weight of the catalyst composition.

Suitable thermal stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing thermal stabilizers.

In one aspect, the thermal stabilizer is present in an amount from about 0.05 wt. % to about 1.0 wt. %, based on the total weight of the catalyst composition. In another aspect, the thermal stabilizer is present in an amount from about 0.1 wt. % to about 1.0 wt. %, based on the total weight of the catalyst composition. In still another aspect, the thermal stabilizer is present in an amount from about 0.1 wt. % to about 0.9 wt. %, based on the total weight of the catalyst composition. In still another aspect, the thermal stabilizer is present in an amount from about 0.05 wt. % to about 1.0 wt. %, based on the total weight of the catalyst composition.

In a further aspect, light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and benzophenones such as 2-hydroxy-4-n-octoxy benzophenone, or the like, or combinations comprising at least one of the foregoing light stabilizers. Light stabilizers are generally used in amounts of about 0.01 wt. % to about 10 wt. %, for example about 0.1 wt. % to about 1 wt. % of the catalyst composition.

In a further aspect, suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis (4H-3,1-benzoxazin-4-one) (CYASORB™ UV-3638); 1,3-bis[(2-cyano-3,3-diphenylacryloyl)oxy]-2,2-bis[[(2-cyano-3,3-diphenyl-acryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 wt. % to about 5 wt. % of the catalyst composition.

In a further aspect, colorants such as pigment and/or dye additives can also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 wt. % to about 10 wt. %, of the catalyst composition.

In a further aspect, suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes;

carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3",5"-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. The dyes can be present in amounts of about 0.1 to about 10 ppm.

The catalyst compositions disclosed herein can include the catalysts disclosed herein and be prepared by or used by the methods disclosed herein.

C. METHODS OF MAKING THE CATALYST AND CATALYST COMPOSITION

Also disclosed herein are methods of making the disclosed catalyst and/or catalyst composition. In another aspect, disclosed herein are methods of making a catalyst and/or a catalyst composition for converting synthesis gas to at least one olefin.

In one aspect, the method of making the catalyst and catalyst composition comprises using any suitable reaction methods or suitable reaction conditions. In another aspect, the method of making the catalyst and catalyst composition can comprise mixing the compounds and heating the mixture.

The following is a non-limiting example of one aspect of how to prepare the catalyst and the catalyst composition. In one aspect, an amorphous silica solution can be stirred and then heated. To prepare an overall salt solution, a heated carbonate salt solution can be mixed with prepared, heated cobalt salt and manganese salt solutions. The overall salt solution can be added simultaneously to the amorphous silica solution while the solutions are stirred. The pH can be maintained while the solution stirs continuously at an elevated temperature. A salt solution comprising X and/or Y can be prepared, and added to the overall salt solution. One or more precipitates can form from the overall salt solution. The one or more precipitates can be filtered, washed, and then dried to produce a catalyst precursor which can be then calcined to provide the final catalyst.

In one aspect, the amorphous silica is heated to a temperature ranging from 50° C. to 150° C., including exemplary values of 60° C., 70° C., 80° C., 90° C., 100° C., 110° C., 120° C., 130° C., and 140° C. In another aspect, the range can be derived from any two exemplary values. For example, the temperature can range from 70° C. to 90° C. In a further aspect, the temperature is 80° C.

In one aspect, the overall salt solution can be heated to a temperature ranging from 50° C. to 150° C., including exemplary values of 60° C., 70° C., 80° C., 90° C., 100° C., 110° C., 120° C., 130° C., and 140° C. In another aspect, the range can be derived from any two exemplary values. For example, the temperature can range from 70° C. to 90° C. In a further aspect, the temperature is 80° C.

In one aspect, the pH can be maintained at a pH ranging from 6 to 8 and left for 15 min to 45 mm as the solution stirs.

In one aspect, to produce the catalyst precursor, the one or more precipitates can be dried at 70° C. to 150° C., including exemplary values of 80° C., 90° C., 100° C., 110° C., 120° C., 130° C., and 140° C. In a further aspect, the range can be derived from any two exemplary values. For example, the temperature can range from 110° C. to 130° C. In one aspect, the precipitate is dried at 120° C. for 16 hours.

In one aspect, the catalyst precursor can be heated to 500° C. for 16 hours with a ramping rate of 2 to 4° C./min from room temperature to give the final catalyst.

In one aspect, the method of making the catalyst or catalyst composition comprises adding cobalt in any suitable form. In another aspect, cobalt can be added using an aqueous solution of a cobalt salt, e.g., chloride, bromide, iodide, fluoride, nitrate, sulfate, perchlorate, acetate, acetyl acetonate, phosphate, or carbonate, or a combination thereof. In a further aspect, the cobalt can be added in the form of a hydrate. In still a further aspect, the cobalt can comprise cobalt nitrate hexahydrate.

In one aspect, the cobalt can be added in solution with a molarity ranging from 0.1 M to 15 M, including representative values of 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two representative values. For example, the cobalt can be added in a solution with a molarity ranging from 0.5 M to 2 M.

In one aspect, the method of making the catalyst composition comprises adding manganese in any suitable form. In another aspect manganese can be added using an aqueous solution of a manganese salt, e.g., chloride, bromide, iodide, fluoride, nitrate, sulfate, perchlorate, acetate, acetyl acetonate, phosphate, or carbonate, or a combination thereof. In a further aspect, the manganese can be added in the form of a hydrate. In still a further aspect, the manganese can comprise manganese nitrate tetrahydrate.

In one aspect, the manganese can be added to the catalyst or catalyst composition in a solution with a molarity ranging from 0.001 M to 15 M, including exemplary values of 0.001 M, 0.005 M, 0.01 M, 0.05 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the manganese can be added to the catalyst or catalyst composition in a solution with a molarity ranging from 0.5 M to 2 M.

In one aspect, the method of making the catalyst or catalyst composition comprises adding silica in any suitable form. In another aspect, silicon can be added using a silica compound, e.g., oxide, chloride, bromide, iodide, fluoride, nitrate, sulfate, perchlorate, acetate, acetyl acetonate, phosphate, carbonate, or the like, or the combination thereof. In a further aspect, the silicon can be in the form of a hydrate. In an even further aspect, the silicon can be in its elemental form. In a yet further aspect, the silica can comprise silica dioxide.

In one aspect, the silicon can be added in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the silicon can be added to the catalyst or catalyst composition in a solution with a molarity ranging from 0.01 M to 5 M.

In one aspect, the method of making the catalyst or catalyst composition comprises adding X comprising an element from Group 11 in any suitable form. In one aspect, X comprises Cu, Ag, or Au, or a combination thereof. In another aspect, X consists of Cu, Ag, or Au, or a combination thereof.

In another aspect, the X comprising an element from Group 11 can be added using a salt of the element, e.g., chloride, bromide, iodide, fluoride, nitrate, sulfate, acetate, carbonate, or the like, or the combination thereof. In a further aspect, X can be in the form of a hydrate.

In one aspect, X can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the X can be added to the catalyst or catalyst composition in a solution with a molarity ranging from 0.01 M to 1 M.

In one aspect, the total X can be added to the catalyst or catalyst composition in a solution with a total molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5M, 11 M, 11.5 M, 12M, 12.5M, 13 M, 13.5 M, 14 M, and 14.5 M. In a further aspect, the molarity can be in a range derived from any two exemplary values. For example, the total X can be added to the catalyst or catalyst composition in a solution with a molarity ranging from 0.01 M to 1 M.

In another aspect, X comprises Cu. In one aspect, Cu can be added using a salt of the element, e.g., chloride, bromide, iodide, fluoride, nitrate, sulfate, acetate, carbonate, or the like, or the combination thereof. In a further aspect, the Cu can be in the fond of a hydrate.

In one aspect, the copper can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the copper can be added to the catalyst or catalyst composition in a solution with a molarity ranging from 0.01 M to 1 M.

In one aspect, the method of making the catalyst or catalyst composition comprises adding Y comprising an element from Group 12 in any suitable form. In one aspect. Y is a Group 12 element. In a further aspect, Y comprises Zn, Cd, or Hg or a combination thereof. In another aspect, Y consists of Zn, Cd, or Hg, or a combination thereof.

In another aspect, the Y comprising an element from Group 12 can be added using a salt of the element, e.g., chloride, bromide, iodide, fluoride, nitrate, sulfate, acetate, carbonate, or the like, or the combination thereof. In a further aspect, Y can be in the form of a hydrate.

In one aspect, Y can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the Y can be added to the catalyst or catalyst composition in a solution with a molarity ranging from 0.01 M to 1 M.

In one aspect, the total Y can be added to the catalyst or catalyst composition in a solution with a total molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the total Y can be added to the catalyst or catalyst composition in a solution with a total molarity ranging from 0.01 M to 1 M.

In another aspect, Y can be Zn. In one aspect, Zn can be added using a salt of the element, e.g., chloride, bromide, iodide, fluoride, nitrate, sulfate, acetate, or carbonate, or the like, or the combination thereof. In a further aspect, Zn can be added in the form of a hydrate.

In one aspect, Zn can be added in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the copper can be added to the catalyst or catalyst composition in a solution with a molarity ranging from 0.01 M to 1 M.

In another aspect, $O_x$ is determined by the valence requirements of the other elements present.

In one aspect, the x of the $O_x$ can range from 0 to 10, including representative values of 0.1, 0.2, 0.2, 0.3, 0.4, 0.5, 0.6, 0.7, 0.8, 0.9, 1, 1.5, 2, 3, 4, 5, 6, 7, 8, and 9. In further aspects, the x can be in a range derived from any two representative values. For example, the x of the $O_x$ can range from 0.1 to 5.

In another aspect, the method of making the catalyst composition comprises adding magnesia as a catalyst support in any suitable form. In one aspect, magnesia can be added using a magnesia compound comprising oxide, chloride, bromide, iodide, fluoride, nitrate, sulfate, perchlorate, acetate, acetyl acetonate, phosphate, or carbonate, or the like, or the combination thereof. In a yet further aspect, the magnesia can be in the form of magnesium/silica dioxide.

In another aspect, the method of making the catalyst composition comprises adding alumina as a catalyst support in any suitable form. In another aspect, alumina can be added using an alumina compound comprising oxide, chloride, bromide, iodide, fluoride, nitrate, sulfate, perchlorate, acetate, acetyl acetonate, phosphate, or carbonate, or the like, or the combination thereof. In a further aspect, the alumina can be in the form of aluminum oxide In one aspect, the method of making the catalyst composition comprises adding silicon as a catalyst support in any suitable form. In another aspect, silicon can be added using a silicon compound comprising oxide, chloride, bromide, iodide, fluoride, nitrate, sulfate, perchlorate, acetate, acetyl acetonate, phosphate, or carbonate, or the like, or the combination thereof. In a further aspect, the silicon can be in the form of silica oxide In one aspect, the method of making the catalyst composition comprises adding zirconia as a catalyst support in any suitable form. In another aspect, zirconia can be added using a zirconia compound comprising oxide, chloride, bromide, iodide, fluoride, nitrate, sulfate, perchlorate, acetate, acetyl acetonate, phosphate, or carbonate, or the like, or the combination thereof. In a further aspect, the zirconia can be in form of zirconium oxide In one aspect, the method of making the catalyst composition comprises adding carbon as a catalyst support in any suitable form. In another aspect, carbon can be added using a carbon compound comprising activated carbon or nonactivated carbon, or a combination thereof.

In one aspect, the method of making the catalyst composition comprises adding carbon as a catalyst support in any suitable form. In another aspect, carbon can be added using a carbon compound comprising activated carbon or nonactivated carbon, or a combination thereof.

In one aspect, the catalyst support can be a single support. In another aspect, the catalyst support can comprise more than one support.

The method of making can be used to prepare the catalyst or the catalyst composition disclosed herein or used by the methods disclosed herein.

D. METHODS OF USING THE CATALYST AND CATALYST COMPOSITION

In one aspect, the present disclosure relates to a method for using a catalyst or a catalyst composition comprising: a) contacting the catalyst or the catalyst composition with a synthesis gas; and b) forming a product mixture comprising an olefin.

In one aspect, the catalyst is prepared using any suitable catalyst preparation technique, in another aspect, the catalyst is prepared using by incipient wetness impregnation.

In one aspect, the catalyst composition is prepared by combining the catalyst with the catalyst support.

In a further aspect, the catalyst support can be added as a compound or as a complex. In a yet further aspect, the compound or the complex can comprise oxide, chloride, bromide, iodide, fluoride, nitrate, sulfate, perchlorate, acetate, acetyl acetonate, phosphate, carbonate, or the like, or the combination thereof. In an even further aspect, the catalyst support as a complex can include the catalyst support coupled with a hydrate, a non-catalytic metal, or a suitable inert material to form a catalyst support complex. As used herein, the non-catalytic metal refers to a metal that does not act as a catalyst to convert the synthesis gas to at least one olefin.

In one aspect, the catalyst support can comprise silicon.

In one aspect, after the catalyst or catalyst composition has been prepared, the catalyst or catalyst composition can be loaded into the reactor for syngas conversion.

In one aspect, the synthesis gas is heated in the presence of the catalyst or catalyst composition at elevated temperature.

In one aspect, the catalyst or catalyst composition is heated in contact with the synthesis gas from 50° C. to 600° C. including exemplary values of 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C., 355° C., 360° C., 365° C., 370° C., 375° C., 380° C., 385° C., 390° C., 395° C., 400° C., 405° C., 410° C., 415° C., 420° C., 425° C., 430° C., 435° C., 440° C., 445° C., 450° C., 455° C., 460° C., 475° C., 480° C., 485° C., 490° C., 495° C., 500° C., 505° C., 510° C., 515° C., 520° C., 525° C., 530° C., 535° C., 540° C., 545° C., 550° C., 555° C., 560° C., 565° C., 570° C., 575° C., 580° C., 585° C., 590° C., 595° C., and 600° C. In a further aspect, the temperature can be in a range derived from any two exemplary values. For example, the temperature can range from 90° C. to 550° C.

In one aspect, the catalyst or catalyst composition can be used to form a product mixture. In another aspect, the product mixture can be formed with low methane formation. In another aspect, the catalyst or catalyst composition can be used to form a product mixture with no or very low carbon dioxide formation. In a further aspect, the catalyst or catalyst composition can be used to form a product mixture with high activity and/or conversion of syngas. In a yet further aspect, the catalyst or catalyst composition can be used to form a product mixture with high total hydrocarbon formation yield.

In one aspect, synthesis gas (or "syngas" or "syn gas") comprises a mixture of primarily hydrogen and carbon monoxide. In another aspect, synthesis gas further comprises carbon dioxide, methane, water, or nitrogen or a combination thereof. In an even further aspect, synthesis gas can comprise other constituents, for example, argon or helium.

In a further aspect, the product mixture comprises one or more olefins. In one aspect, one or more olefins comprise carbons ranging from two carbons to 12 carbons, including 3, 4, 5, 6, 7, 8, 9, 10, or 11 carbons. In one aspect, the range can be derived from any two preceding values. For example, the one or more olefins can comprise carbons ranging from three to eleven carbons.

In one aspect, the olefin comprises at least one double bond. In another aspect, the olefin comprises two double bonds. In a further aspect, the olefin comprises three double bonds.

In one aspect, the olefin comprises ethylene, propene, 1-butene, 1-pentene, 1-heptene, 1-hexene, 2-ethyl-hexylene, 2-ethyl-heptene, 1-octene, 1-nonene, or 1-decene, or a combination thereof.

In one aspect, the olefin comprises multiple double bonds. In one aspect, the olefin can be a diolefin. In a further aspect, the olefin can be 1,3-butadiene, 1,4-pentadiene, heptadiene, or a combination thereof. In one aspect, the olefin can be a cyclic olefin and diolefin. In a further aspect, the olefin can be cyclopentene, cyclopentadiene, cyclohexene, cyclohexadiene, or methyl cyclopentadiene and the like; or a cyclic diolefindiene, e.g., dicyclopentadiene, methylcyclopentadiene dimer and the like.

In one aspect, one or more paraffins comprise an alkane. In one aspect, the paraffin comprises methane, propane, hexane, butane, pentane, or 2-methylpentane or a combination thereof.

In a further aspect, the product mixture comprises methane. In one aspect, the product mixture comprises a minimal amount of methane. In one aspect, the product mixture does not comprise methane. In another aspect, the product mixture is substantially free of methane. In a further aspect, the product mixture comprises a trace amount of methane.

In an even further aspect, the product mixture comprises carbon dioxide. In another aspect, the product mixture comprises no carbon dioxide. In a further aspect, the product mixture comprises a minimal amount of carbon dioxide. In one aspect, the product mixture does not comprise carbon dioxide. In another aspect, the product mixture is substantially free of carbon dioxide. In a further aspect, the product mixture comprises a trace amount of carbon dioxide.

In one aspect, the product mixture consists essentially of carbon dioxide, methane, one or more paraffins, and one or more olefins. In a further aspect, the product mixture consists essentially of methane and one or more olefins. In an even further aspect, the product mixture consists essentially of methane, one or more paraffins, and one or more olefins. In a yet further aspect, the product mixture consists essentially of one or more paraffins and one or more olefins.

In one aspect, the conversion of synthesis gas to the product mixture can range from 20% to 100%, including representative values of 20%, 30%, 40%, 50%, 55%, 60%, 65%, 70%, 75%, 80%, 85%, 90%, and 95%. In a further aspect, the range can be derived from any two representative values. For example, the conversion of synthesis gas to the product mixture ranges from 50% to 100%

In one aspect, the product mixture comprises a total amount of olefin in an amount ranging from 25 wt. % to 75 wt. %, based on the total weight of the product mixture, including representative values 25, 30, 35, 40, 45, 50, 55, 60, 65, 70, and 75 wt. %. In a further aspect, the range can be derived from any two representative values. For example, the product mixture comprises an olefin in an amount ranging from 21 wt. % to 41 wt. %, based on the total weight of the product mixture In one aspect, the product mixture comprises carbon dioxide in an amount ranging from 5 wt. % to 40 wt. %, based on the total weight of the product mixture including representative values 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, and 40 wt. %. For example, the product mixture comprises carbon dioxide in an amount ranging from 9 wt. % to 30 wt. %, based on the total weight of the product mixture In one aspect, the product mixture comprises methane in an amount ranging from 3 wt. % to 15 wt. %, based on the total weight of the product mixture including representative values 6 wt. %, 7 wt. %, 8 wt. %, 9 wt. %, 10 wt. %, 11 wt. %, 12 wt. %, 13 wt. %, and 14 wt. %. For example, the product mixture comprises methane in an amount ranging from 7 wt. % to 9 wt. %, based on the total weight of the product mixture.

In one aspect, the product mixture comprise a total amount of paraffin in an amount ranging from 15 wt. % to 35 wt. %, based on the total weight of the product mixture including representative values 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. % and 40 wt. %. For example, the product mixture comprises paraffin in an amount ranging from 20 wt. % to 35 wt. %, based on the total weight of the product mixture.

E. ASPECTS

The disclosed compositions and methods include at least the following aspects.

Aspect 1: A catalyst comprising $CoMn_aSi_bX_cY_dO_x$ wherein:
X comprises an element from Group 11; Y comprises an element from Group 12;
a ranges from 0.8 to 1.2;
b ranges from 0.1 to 1;
c ranges from 0 to 0.05;
d ranges from 0 to 0.05;
x is a number determined by the valency requirements of the other elements present; and
wherein the catalyst converts synthesis gas to at least one olefin.

Aspect 2: The catalyst of aspect 1, wherein c ranges from 0.001 to 0.05.

Aspect 3: The catalyst of any of aspects 1-2, wherein d ranges from 0.001 to 0.05.

Aspect 4: The catalyst of any of aspects 1-3, wherein c ranges from 0.001 to 0.05 and d is 0.

Aspect 5: The catalyst of any of aspects 1-4, wherein d ranges from 0.001 to 0.05 and c is 0.

Aspect 6: The catalyst of any of aspects 1-5, wherein the catalyst does not comprise a carbonate group.

Aspect 7: The catalyst of any of aspects 1-6, wherein X is copper.

Aspect 8: The catalyst of any of aspects 1-7, wherein Y is zinc.

Aspect 9: The catalyst of any aspects 1-8, wherein Si is an amorphous silica.

Aspect 10: The catalyst of aspect 9, wherein the pH of the amorphous silica ranges from 3 to 5.

Aspect 11: The catalyst of any of aspects 1-10, wherein the specific surface area of the silica ranges from 100 $m^2/g$ to 800 $m^2/g$.

Aspect 12: A catalyst composition comprising the catalyst of any of aspects 1-11 and a catalyst support comprising magnesia, alumina, silica, zirconia, titania, carbon, or zeolite, or a combination thereof.

Aspect 13: The catalyst composition of aspect 12, wherein the carbon comprises activated carbon or nonactivated carbon, or a combination thereof.

Aspect 14: The catalyst composition of any aspects 12-13, wherein the catalyst composition is in the form of a fluidizable particle, a shaped pellet, a sphere, or a shaped extrudate.

Aspect 15: A method for using a catalyst composition comprising:
  a) contacting the catalyst or the catalyst composition of any of aspects 1-14 with a synthesis gas; and
  b) forming a product mixture comprising an olefin Aspect 16: The method of aspect 15, wherein the olefin comprises carbons ranging from two carbons to 12 carbons.

Aspect 17: The method of any aspects 15-16, wherein the olefin comprises at least one double bond.

Aspect 18: The method of any of aspects 15-17, wherein the olefin comprises ethylene, propene, 1-butene, 1-pentene, 1-hexene, 1-heptene, 2-ethyl-hexylene, 2-ethyl-heptene, 1-octene, 1-nonene, or 1-decene, or a combination thereof.

Aspect 19: The method of any of aspects 15-18, wherein the conversion of synthesis gas to the product mixture ranges from 20% to 100%.

Aspect 20: The method of any of aspects 15-19, wherein the product mixture comprises a total amount of olefin in an amount ranging from 25 wt. % to 75 wt. %, based on the total weight of the product mixture.

Aspect 21: The method of any of aspects 15-20, wherein the product mixture comprises carbon dioxide in an amount ranging 5 wt, % to 40 wt. %, based on the total weight of the product mixture.

Aspect 22: The method of any of aspects 15-21, wherein the product mixture comprises methane in an amount ranging from 3 wt. % to 15 wt. %, based on the total weight of the product mixture.

Aspect 23: The method of any of aspects 15-22, wherein the product mixture comprises a total amount of paraffin in an amount ranging from 15 wt. % to 40 wt. %, based on the total weight of the product mixture.

Aspect 24: The method of any of aspects 15-23, wherein the product mixture consists essentially of carbon dioxide, methane, one or more paraffins, and one or more olefins.

Aspect 25: The method of any of aspects 23-24, wherein one or more paraffins comprises an alkane.

Aspect 26: A catalyst comprising $CoMn_aSi_bCu_cZn_dO_x$; wherein
  a ranges from 0.8 to 1.2;
  b ranges from 0.1 to 1;
  c ranges from 0.001 to 0.05;
  d ranges from 0.001 to 0.05;
  x is a number determined by the valency requirements of the other elements present; and
  wherein the catalyst converts synthesis gas to at least one olefin.

F. EXPERIMENTAL

The following examples are put forth so as to provide those of ordinary skill in the art with a complete disclosure and description of how the compounds, compositions, articles, devices and/or methods claimed herein are made and evaluated, and are intended to be purely representative of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing the compounds of this invention are illustrated in the following Examples. Starting materials and the requisite intermediates are in some cases commercially available, or can be prepared according to literature procedures or as illustrated herein.

The following representative compounds of the invention were synthesized. The Examples are provided herein to illustrate the invention, and should not be construed as limiting the invention in any way. The Examples are typically depicted in free base form, according to the IUPAC naming convention. However, some of the Examples were obtained or isolated in salt form.

As indicated, some of the Examples were obtained as racemic mixtures of one or more enantiomers or diastereomers. The compounds may be separated by one skilled in the art to isolate individual enantiomers. Separation can be carried out by the coupling of a racemic mixture of compounds to an enantiomerically pure compound to form a diastereomeric mixture, followed by separation of the individual diastereomers by standard methods, such as fractional crystallization or chromatography. A racemic or diastereomeric mixture of the compounds can also be separated directly by chromatographic methods using chiral stationary phases.

1. Example 1: Preparation of Comparative Catalyst Composition $CoMnSiO_2$

For the preparation of the catalyst composition, 0.6 g of amorphous silica was added to 50 ml distilled water and this first solution was stirred at room temperature for 1 to 2 hours. The first solution was then heated at 70-80° C. A second solution 50 ml of 1 M aqueous solution of Co(NO3)2.6H2O was prepared and mixed with a prepared 50 ml solution of 1M Mn(NO3)2.4H20. The resulting mixture was heated at 70-80° C. A 100 ml solution of 1M carbonate was heated at 70-80° C. The second solution and the aqueous carbonate solution were added simultaneously to the first solution while stirring continuously at 70-80° C. The pH of the resulting solution was maintained at 7 for a half hour and stirred continuously at 80° C. The precipitate was filtered and then washed several times with warm distilled water. The precipitate was then dried at 120° C. for 10-18 h, and subsequently cooked in static air in the furnace from 400 to 600° C. for 15-24 h.

2. Example 2: Preparation of Catalyst Composition $CoMnSiZnO_2$

For the preparation of the catalyst composition, 0.6 g of amorphous silica was added to 50 ml distilled water. This first solution was stirred at room temperature for 1 to 2 hours and then heated to 70-90° C. A second solution of 50 ml of 1M aqueous Co(NO3)2.6H2O is prepared and mixed with a 50 ml solution of 1M Mn(NO3)2.4H20. A 100 ml volume of 1M carbonate solution was heated to 70-80° C. The second solution and carbonate solution were added simultaneously to the first silica solution while continuously stirred at 80° C. The pH was maintained at 7.0, and maintained for half an hour while continuing to stir at 80° C. A solution of 0.75 g Zn salt dissolved in 5 ml distilled water at room temperature was prepared. The precipitate was filtered and then washed several times with warm distilled water. Then, the precipitate was dried at 120° C. for 10 to 18 h, subsequently cooked in static air in the furnace from 400° C. to 600° C. for 15-24 h.

3. Example 3: Preparation of Catalyst Composition CoMnSiCuZnO$_2$

For the preparation of the catalyst composition, 0.6 g of amorphous silica was added to 50 ml distilled water and this first solution was stirred at room temperature for 1 to 2 hours. The first solution was then heated at 70-80° C. A second solution of 50 ml of 1 M aqueous solution of Co(NO$_3$)$_2$.6H$_2$O was prepared and mixed with a prepared solution of 50 ml solution of 1M Mn(NO$_3$)$_2$.4H$_2$O. The resulting mixture was heated at 70-80° C. A 100 ml solution of 1M carbonate was heated at 70-80° C. The second solution and the aqueous carbonate solution were added simultaneously to the first solution while solutions stirred continuously at 70-80° C. The pH of the resulting solution was maintained at 7 for half hour and stirred continuously at 80° C. A solution of 0.75 g Zn salt dissolved in 5 ml distilled water and a solution of 0.75 g Cu salt dissolved in 5 ml distilled water at room temperature were prepared. The precipitate was first filtered and then washed several times with warm distilled water. The precipitate was then dried at 120° C. for 10 to 18 h and subsequently cooked in static air in the furnace from 400 to 600° C. for 15-24 h.

4. Catalyst Evaluation

The catalysts from examples 1-3 were evaluated as shown in Table 1, Examples 2-3 are inventive, with Example 1 as a comparative example. As can be seen in Table 1, the inventive examples formed a greater weight percentage of olefins (27 wt % to 40 wt %), compared to the comparative example with a weight percentage of olefin of 22 wt %.

TABLE 1

| Examples | Catalyst composition | CO conversion (%) | CO2 (%) | CH4 (%) | Total olefins (%) | Total paraffins (%) |
|---|---|---|---|---|---|---|
| 1 | CoMn$_a$Si$_b$X$_{0\%}$Y$_{0\%}$O$_x$ | 100 | 29 | 9 | 22 | 32 |
| 2 | CoMn$_a$Si$_b$X$_{0\%}$Y$_{3\%}$O$_x$ | 85 | 36 | 7 | 27 | 20 |
| 3 | CoMn$_a$Si$_b$X$_{3\%}$Y$_{3\%}$O$_x$ | 53 | 10 | 9 | 40 | 28 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as representative only, with a true scope and spirit of the invention being indicated by the following claims.

What is claimed is:

1. A catalyst comprising
CoMn$_a$Si$_b$X$_c$Y$_d$O$_x$
wherein X comprises an element from Group 11; Y comprises an element from Group 12;
a ranges from 0.8 to 1.2;
b ranges from 0.1 to 1;
c ranges from 0.001 to 0.05;
d ranges from 0.001 to 0.05;
x is a number determined by the valency requirements of the other elements present; and
wherein the catalyst converts synthesis gas to at least one olefin.

2. The catalyst of claim 1, wherein the catalyst does not comprise a carbonate group.

3. The catalyst of claim 1, wherein X is copper and wherein Y is zinc.

4. The catalyst of claim 1, wherein the Si is an amorphous silica and wherein the amorphous silica has a pH in the range from 3 to 5.

5. The catalyst of claim 4, wherein the specific surface area of the amorphous silica ranges from 100 m$^2$/g to 800 m$^2$/g.

6. The catalyst of claim 1, wherein the catalyst consists essentially of

CoMn$_a$Si$_b$Cu$_c$Zn$_d$O$_x$.

7. A catalyst composition comprising the catalyst of claim 1 and a catalyst support comprising magnesia, alumina, silica, zirconia, titania, carbon, or zeolite, or a combination thereof.

8. The catalyst composition of claim 7, wherein the catalyst composition comprises carbon comprising activated carbon or nonactivated carbon, or a combination thereof.

9. The catalyst composition of claim 7, wherein the catalyst composition is in the form of a fluidizable particle, a shaped pellet, a sphere, or a shaped extrudate.

10. A method for using a catalyst composition comprising:
contacting the catalyst of claim 1 with a synthesis gas; and
forming a product mixture comprising an olefin.

11. The method of claim 10, wherein the olefin comprises carbons ranging from two carbons to 12 carbons.

12. The method of claim 10, wherein the olefin comprises ethylene, propene, 1-butene, 1-pentene, 1-hexene, 1-heptene, 2-ethyl-hexylene, 2-ethyl-heptene, or 1-octene, 1-nonene, or 1-decene, or a combination thereof.

13. The method of claim 10, wherein the conversion of synthesis gas to the product mixture ranges from 20% to 100%.

14. The method of claim 10, wherein the product mixture comprises a total amount of olefin in an amount ranging from 25 wt. % to 75 wt. %, based on the total weight of the product mixture.

15. The method of claim 10, wherein the product mixture comprises carbon dioxide in an amount ranging from 5 wt. % to 40 wt. %, based on the total weight of the product mixture.

16. The method of claim 10, wherein the product mixture comprises methane in an amount ranging from 3 wt. % to 15 wt. %, based on the total weight of the product mixture.

17. The method of claim 10, wherein the product mixture comprise a total amount of paraffin in an amount ranging from 15 wt. % to 40 wt. %, based on the total weight of the product mixture.

18. The method of claim 10, wherein the product mixture consists essentially of carbon dioxide, methane, one or more paraffins, and one or more olefins.

* * * * *